(12) United States Patent
Pulliam

(10) Patent No.: US 7,093,824 B2
(45) Date of Patent: Aug. 22, 2006

(54) PORTABLE FENCING SYSTEM AND COMPONENTS THEREFOR

(76) Inventor: Bryan J. Pulliam, 7555 N. Greenwich Rd., Wichita, KS (US) 67226-8254

( * ) Notice: Subject to any disclaimer, the term of this patent is extended or adjusted under 35 U.S.C. 154(b) by 0 days.

(21) Appl. No.: 10/914,900

(22) Filed: Aug. 10, 2004

(65) Prior Publication Data

US 2005/0012084 A1  Jan. 20, 2005

Related U.S. Application Data

(62) Division of application No. 09/766,222, filed on Jan. 19, 2001, now Pat. No. 6,866,252.

(60) Provisional application No. 60/177,408, filed on Jan. 20, 2000.

(51) Int. Cl.
*B21F 27/00* (2006.01)
*E04H 17/02* (2006.01)

(52) U.S. Cl. .............................. 256/40; 256/42; 256/35

(58) Field of Classification Search ............ 256/32–33, 256/35–37, 40–42, 47
See application file for complete search history.

(56) References Cited

U.S. PATENT DOCUMENTS

| | | | |
|---|---|---|---|
| 406,642 A | 7/1889 | Frost |
| 427,787 A | 5/1890 | McNelly |
| 475,867 A | 5/1892 | Hult |
| 560,364 A | 5/1896 | Owens |
| 717,616 A | 1/1903 | Price |
| 775,931 A | 11/1904 | Ott |
| 801,942 A | 10/1905 | Warner et al. |
| 1,014,035 A | 1/1912 | Belk |
| 1,117,313 A | 11/1914 | Blakley |
| 1,210,261 A | 12/1916 | Begneaud |
| 1,435,059 A | 11/1922 | Franzen |
| 2,612,695 A | 10/1952 | Schneider et al. |
| 3,361,411 A | 1/1968 | Reigh |
| 3,717,327 A | 2/1973 | Schmidt et al. |
| 3,840,203 A | 10/1974 | Sheehy |
| 3,940,114 A | 2/1976 | Rivelli ....................... 256/32 |

(Continued)

FOREIGN PATENT DOCUMENTS

DE          937855          1/1956

(Continued)

OTHER PUBLICATIONS

International Application No. PCT/US01/01917. Pulliam, Bryan J. International Preliminary Examination Report Written Opinion. Written Opinion issued Dec. 21, 2001. (5 pages).

(Continued)

*Primary Examiner*—James K. Trujillo
(74) *Attorney, Agent, or Firm*—Aileen Law; Patent Law Offices of Rick Martin, P.C.

(57) ABSTRACT

A portable fencing system in a barricade or corridor arrangement utilizes at a minimum one each of a corner post fixture, and a fence wire. In an enclosure arrangement, the portable fencing system can utilize at least one winch corner fixture, a plurality of corner post fixtures, a plurality of spacer posts and a plurality of fence wires. Spacer posts are spaced from one another and from a winch corner fixture and corner post fixtures such that the winch corner fixture, corner post fixtures, spacer posts and fence wires all together can form any suitable arrangement in relation to one another to provide an enclosure barrier around an area or a barricade or corridor along a side of an area.

19 Claims, 8 Drawing Sheets

U.S. PATENT DOCUMENTS

| | | | |
|---|---|---|---|
| 4,349,181 A | 9/1982 | Asher et al. | |
| 4,854,521 A | 8/1989 | Farnsworth | 242/86.5 |
| 5,104,074 A | 4/1992 | Malloy | 248/156 |
| 5,139,235 A | 8/1992 | Kilmer | |
| 5,356,101 A | 10/1994 | Malloy | 248/156 |
| 5,394,927 A | 3/1995 | Huebner | 160/327 |
| 5,460,344 A | 10/1995 | Malloy | 248/156 |
| 5,593,142 A * | 1/1997 | Gerhart | 256/54 |
| 5,649,690 A | 7/1997 | Kilmer | |
| 6,070,823 A | 6/2000 | Clary | 242/388.1 |
| 6,102,321 A | 8/2000 | Clary | 242/388.4 |

FOREIGN PATENT DOCUMENTS

| | | |
|---|---|---|
| DE | 4103901 | 8/1991 |
| FR | 2550053 | 2/1985 |
| GB | 722086 | 1/1955 |
| JP | 2000199395 | 7/2000 |

OTHER PUBLICATIONS

International Application No. PCT/US01/01917. Pulliam, Bryan J. International Search Report. Search Report issued Jun., 15, 2001. (3 pages).

U.S. Appl. No. 09/766,222, filed Nov. 29, 2001, Pulliam.

Horizont Trekking Kit; (3 pages).

Zareba Systems EZEE Corral (4 pages).

* cited by examiner

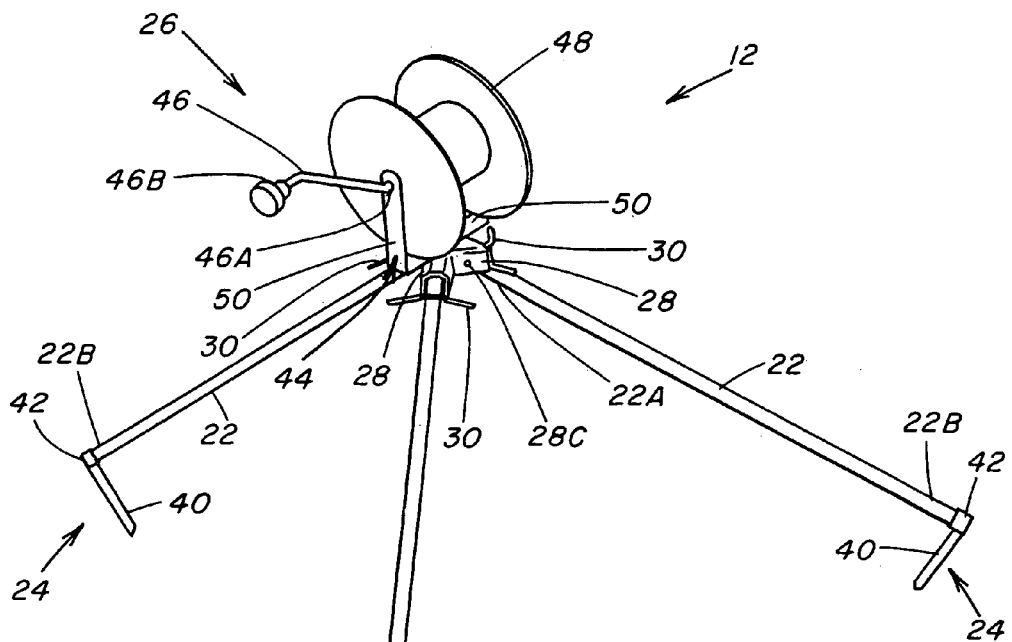
FIG. 2
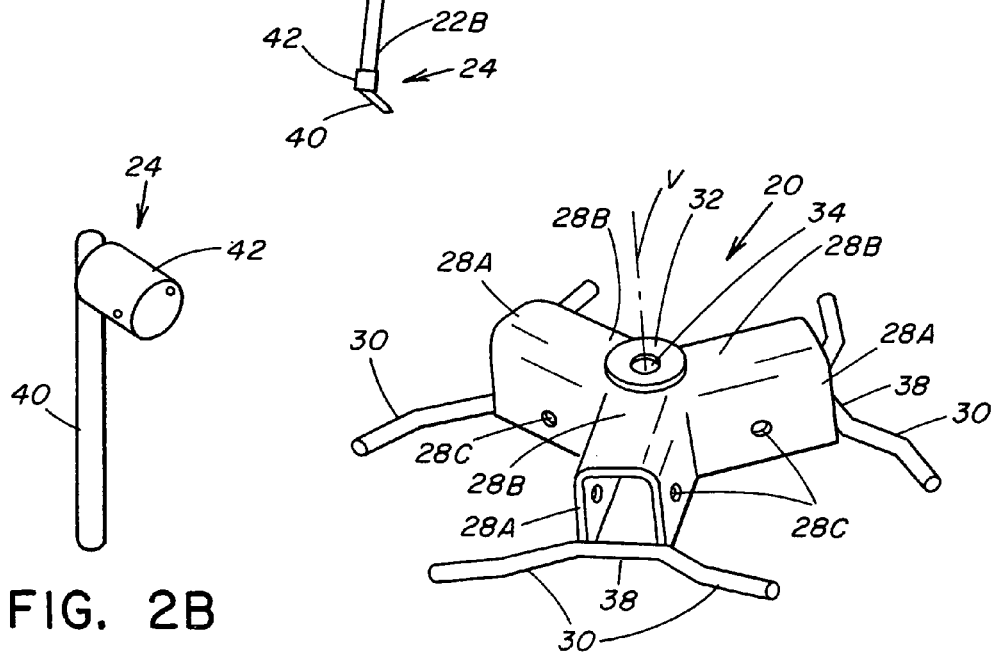
FIG. 2B
FIG. 2A

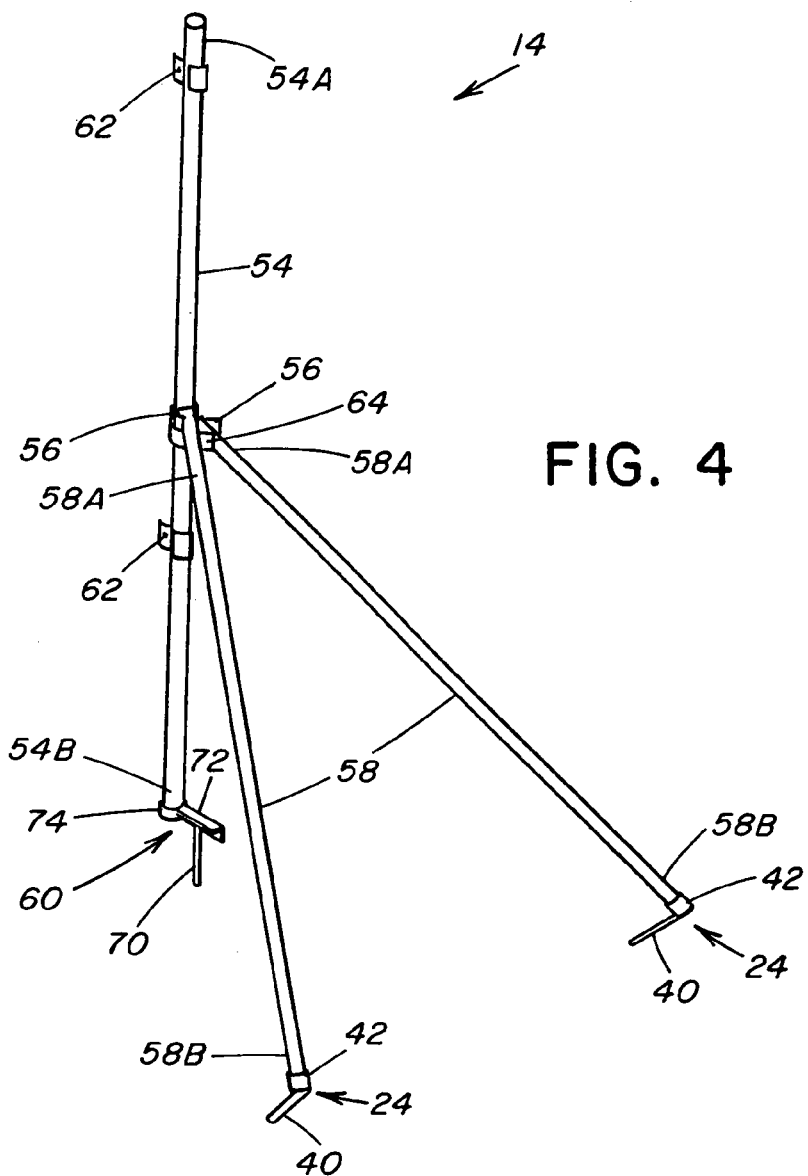
FIG. 4
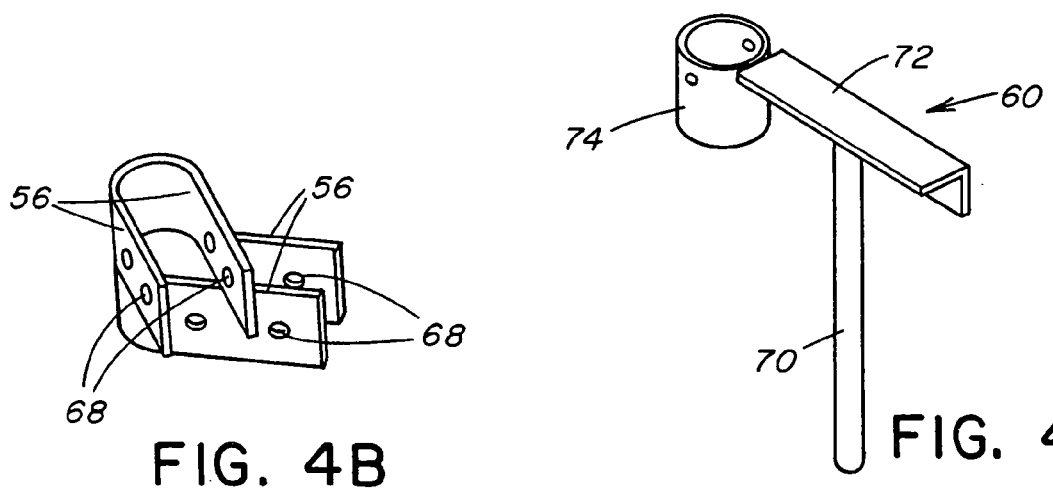
FIG. 4B
FIG. 4A

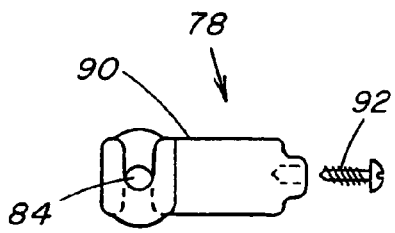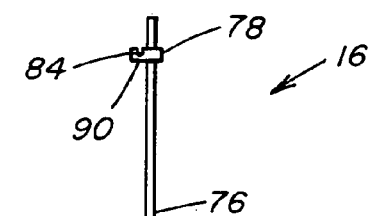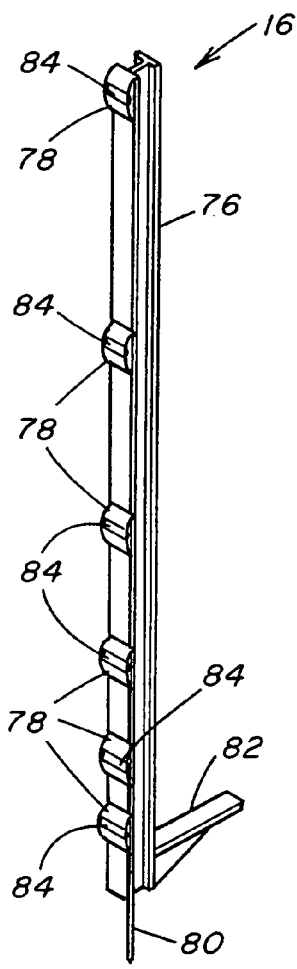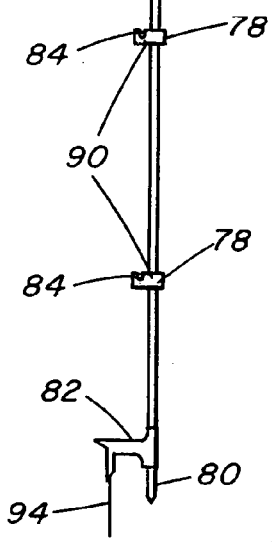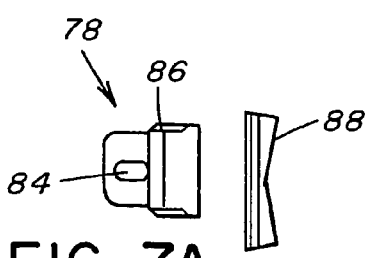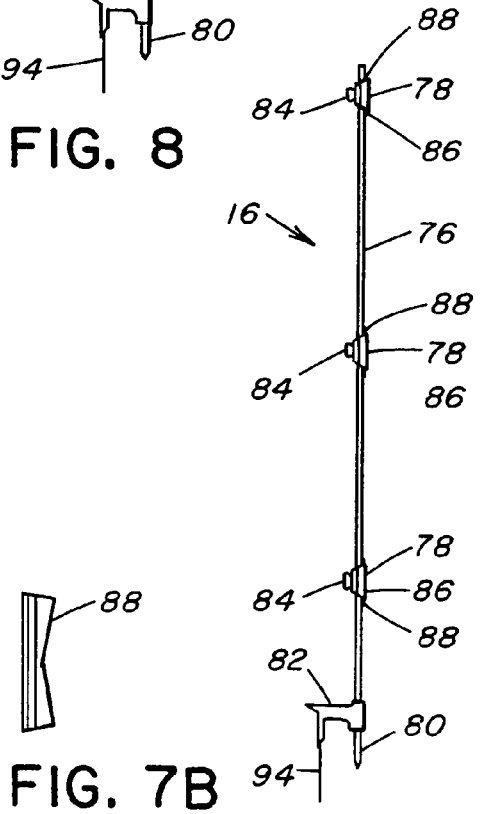

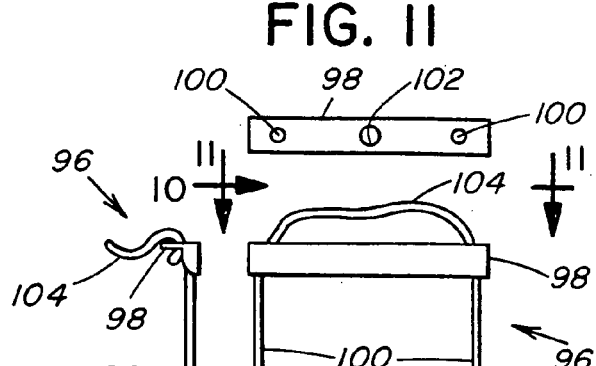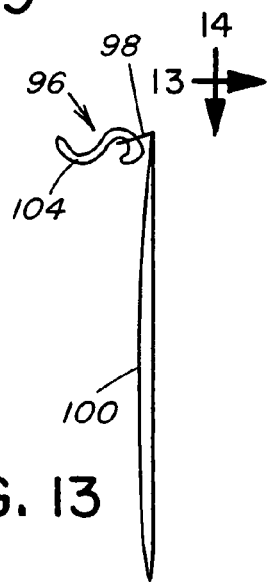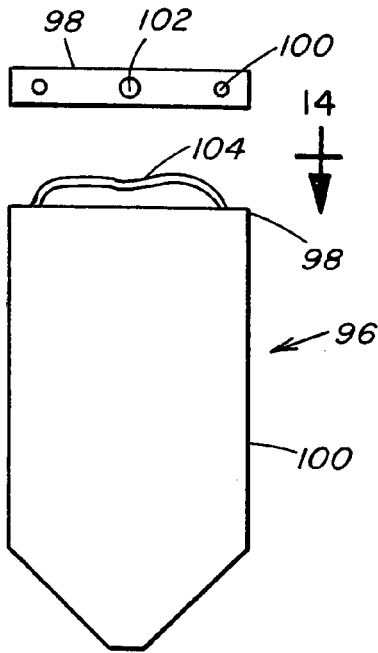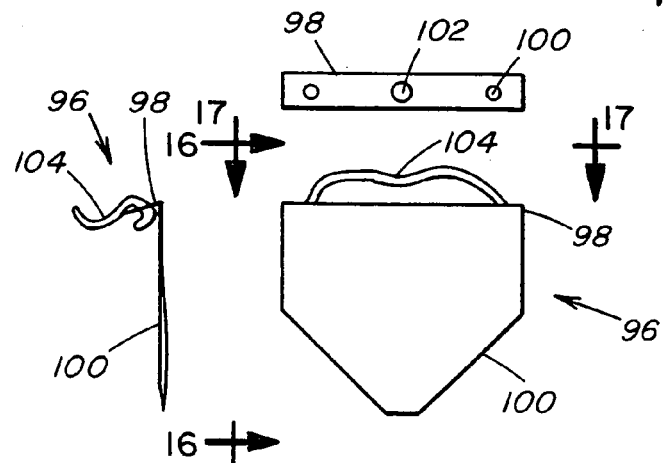

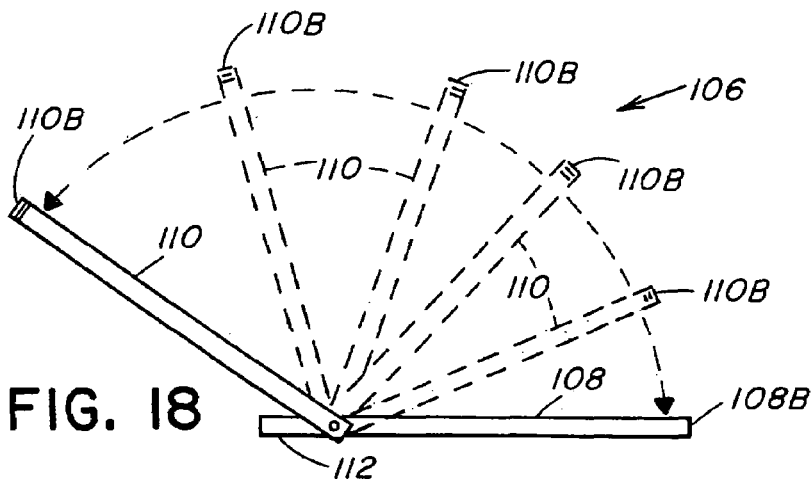
FIG. 18
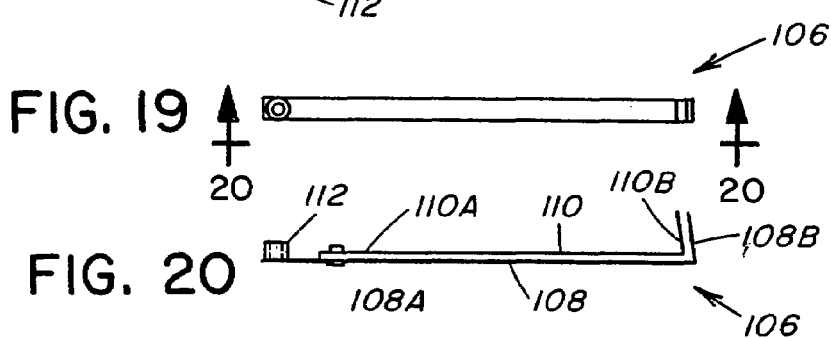
FIG. 19
FIG. 20
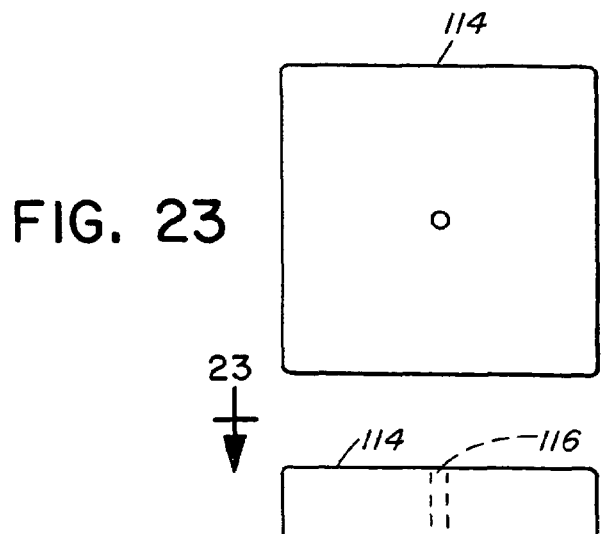
FIG. 23
FIG. 22
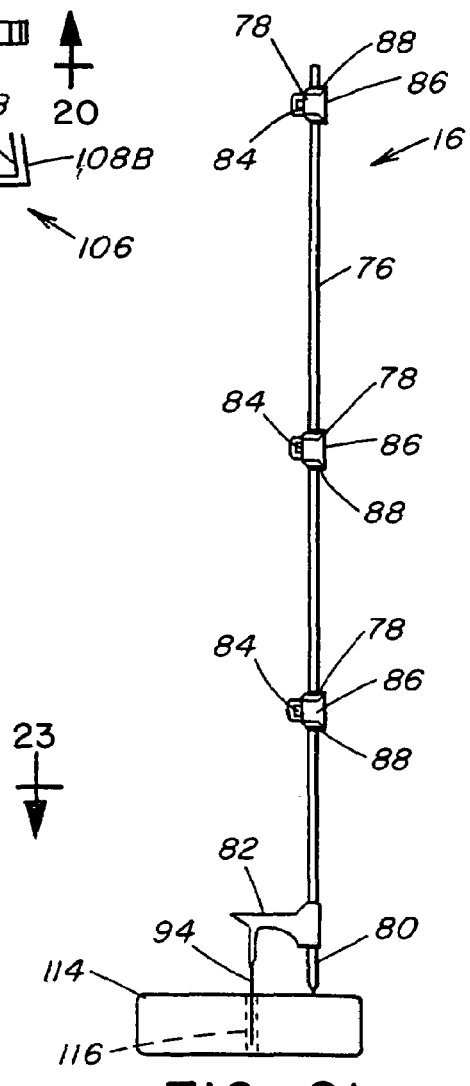
FIG. 21

PORTABLE FENCING SYSTEM AND COMPONENTS THEREFOR

REFERENCE TO RELATED APPLICATION

This non-provisional utility application is a divisional of parent application Ser. No. 09/766,222 filed Jan. 19, 2001 now U.S. Pat. No. 6,866,252, titled "Portable Fencing System and Components Therefor" which claims the benefit of provisional application No. 60/177,408 filed Jan. 20, 2000.

FIELD OF THE INVENTION

The present invention generally relates to fencing systems and, more particularly, is concerned with a portable fencing system and the components therefor which enable quick and easy setup and removal.

BACKGROUND OF THE INVENTION

Rotational grazing is a pasture management technique that divides a particular pasture into smaller paddocks for grazing of the pasture by livestock and horses in a controlled manner. It is known to use fencing systems for this purpose. The fencing systems must contain the animals' grazing activities to the defined area for a short amount of time, which keeps them from inflicting damage to the grass. Once a particular paddock has been appropriately grazed the animals are moved to another paddock which allows for the just grazed paddock to quickly and efficiently recover and be ready for the next grazing cycle.

Rotational grazing is beneficial to both the animal and the pasture. The animal does not have to graze down to the roots where there is lower nutritional value and/or higher concentrations of fructans (grass "sugars") and where it may take in bacteria that may be harmful. Since the pasture is never over-grazed, the grass stays healthier and more efficiently produces the roughage that the animal needs. The result is a significant reduction in the acres of pasture required per animal and an improvement in the nutritional quality of the feed the pasture produces.

The more intense the pasture management, the shorter the grazing cycle will be and the more paddocks a pasture will require. This creates a need for fencing systems to accommodate the temporary containment of the animals into smaller areas and their movement between these areas. The use of a permanent fencing system for this type of pasture management will congest the field with a large maze of fencing and make it very difficult for the farmer or rancher to use tractors and implements for the conditioning and maintenance work he has to do to maintain the pasture. Permanent fencing systems would also severely restrict the manager's ability to respond to varying conditions within the pasture which may dictate the need to define grazing areas that do not fit the existing arrangement of the permanent fencing system.

The inventor herein envisions that the ideal system is a portable fencing system that can be quickly and easily set up to define a small grazing area and then removed and set up at another grazing area, used to make corridors for the efficient movement of animals, and used to otherwise manage the number and location of animals on the grazing areas. Such portable fencing system would give the pasture manager flexibility in providing for efficient grazing and recovery of the pasture. Thus, in order for rotational grazing to be optimized and labor intensity minimized, the portable fencing system needs to be quick and easy to set up, securely anchored to the ground so that it will stay in place, and require few or no tools to install and remove it.

An example of a prior art portable fencing system is disclosed in U.S. Pat. No. 5,649,690 to Kilmer. The Kilmer system utilizes a plurality of portable fence post support assemblies each having a post for supporting a number of wires, a base member configured for placement lengthwise on the ground for supporting the post thereabove in an upright orientation, an angled brace attached to and extending between the post and base member, and a plurality of anchoring devices in the form of an auger and/or spikes mounted through and extending below the base and into the ground. While the Kilmer system appears to be a step in the right direction, it appears to fall far short of having the characteristics of an ideal portable fencing system as outlined above. The Kilmer fence post support assemblies seem rather bulky, cumbersome and awkward to handle and thus would not be likely to enable a user to be able to quickly and easily set up and take down such fencing system.

Consequently, a need exists for an innovation which will overcome the inadequacies of the prior art fencing systems and more nearly have the characteristics of an ideal portable fencing system as outlined above.

SUMMARY OF THE INVENTION

The present invention provides a portable fencing system and components therefor that satisfy the aforementioned need and more nearly meet all characteristics of the ideal portable fencing system. The portable fencing system of the present invention and the components used therein are strong, stable and durable and enable quick and easy setup and removal by only requiring shallow or no soil penetration to provide the needed anchorage of the system to the ground so as to stay in place and without the use of tools.

Accordingly, the present invention is directed to a portable fencing system useful for forming a barricade or corridor arrangement. The portable fencing system comprises: (a) a winch corner fixture removably anchorable on a ground segment for providing one end of a barricade or corridor arrangement along a side of an area adjacent to the ground segment; (b) a corner post fixture removably anchorable on another ground segment for providing an end of the barricade or corridor arrangement along the side of the area adjacent to the ground segments; (c) at least one spacer post locatable between and spaced from the winch corner fixture and the corner post fixture and removably attachable on another ground segment along the side of the area adjacent to the ground segments; and (d) at least one length of fence wire storable on the winch corner fixture and extendable therefrom so as to extend between the fixtures and past the spacer post, the winch corner fixture and corner post fixture having means for securing the fence wire thereto, the spacer post having means for engaging the fence wire.

The present invention also is directed to a portable fencing system useful for forming an enclosure arrangement. The portable fencing system comprises: (a) a winch corner fixture removably anchorable on a ground segment for providing one corner of an enclosure arrangement about an area adjacent to the ground segment; (b) a plurality of corner post fixtures removably anchorable on other ground segments for providing other corners of the enclosure arrangement about the area adjacent to the ground segments; (c) a plurality of spacer posts spaced from one another and locatable between and spaced from the winch corner fixture and the corner post fixtures and removably attachable on still other ground segments for providing side portions of the enclosure arrangement between the corners thereof and about the area adjacent to the ground segments; and (d) at least one length of fence wire storable on the winch corner fixture and extendable therefrom so as to extend between the fixtures and past the spacer posts, the winch corner fixture and, each of said corner post fixture having means for securing the fence wire thereto, the spacer posts having means for engaging the fence wire.

The present invention further is directed to a winch corner fixture useful in a portable fencing system. The winch corner fixture comprises: (a) a main support frame having at least three mounting portions angularly displaced from one another about a central vertical axis of the main support frame; (b) means for securing portions of a fence wire to the main support frame; and (c) a plurality of at least three spaced apart leg members each pivotally mounted to one of the three mounting portions of the main support frame such that the leg members can be set up in a tripod configuration about the central vertical axis of the support frame with the leg members angularly displaced from one another about the central vertical axis at the same angular displacements of the three mounting portions of the support frame from one another; and (d) a winch assembly supported on the main support frame above the three mounting portions thereof. The winch corner fixture further comprises a plurality of at least three ground anchor stakes each attached to an end of one of the leg members and adapted to be inserted into a ground segment by stepping thereon. The attaching means is a plurality of brackets attached to the main support frame adjacent to the three mounting portions thereof and adapted for securing a portion of the fence wire to a selected one of the brackets.

The present invention still further is directed to a corner post fixture useful in a portable fencing system. The corner post fixture comprises: (a) a post member; (b) a pair of brace members; and (c) a pair of support brackets each separate from the other and independently adjustably mounted on the post member between opposite ends thereof, each of the brace members being pivotally mounted to one of the support brackets such that the brace members are angularly displaced from one another about the post member and each can be extended outwardly and downwardly at an acute angle relative to the post member. The corner post fixture further comprises a pair of the ground anchor stakes each attached to an end of one of the brace members and adapted to be inserted into a ground segment by stepping thereon.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 2 is an enlarged assembled perspective view of a winch corner fixture of the system of FIG. 1.

FIG. 2A is an enlarged perspective view of a main support frame of the winch corner fixture of FIG. 2.

FIG. 2B is an enlarged perspective view of a ground anchor stake of the winch corner fixture of FIG. 2.

FIG. 4 is an enlarged assembled perspective view of a corner post fixture of the system of FIG. 1.

FIG. 4A is an enlarged perspective view of a step bracket anchor stake of the corner post fixture of FIG. 4.

FIG. 4B is an enlarged perspective view of a brace member support bracket of the corner post fixture of FIG. 4.

FIG. 6 (prior art) is an enlarged perspective view of a first embodiment of a spacer post of the system of FIG. 1.

FIG. 7 (prior art) is an enlarged side elevational view of a second embodiment of the spacer post of the system of FIG. 1.

FIG. 7A (prior art) is an enlarged side elevational view of an adjustable wire guiding device of the spacer post of FIG. 7.

FIG. 7B (prior art) is a side elevational view of a double wedge used with the wire hanger of FIG. 7A.

FIG. 8 (prior art) is an enlarged side elevational view of a third embodiment of the spacer post of the system of FIG. 1.

FIG. 8A (prior art) is an enlarged side elevational view of an adjustable wire guiding device of the spacer post of FIG. 8.

FIG. 9 is a front elevational view of a first embodiment of a mounting point device used with the system of FIG. 1 in weak soil conditions.

FIG. 10 is a side elevational view of the mounting point device as seen along line 10—10 of FIG. 9.

FIG. 11 is a top plan view of the mounting point device as seen along line 11—11 of FIG. 9.

FIG. 12 is a front elevational view of a second embodiment of the mounting point device used with the system of FIG. 1 in sand conditions.

FIG. 13 is a side elevational view of the mounting point device as seen along line 13—13 of FIG. 12.

FIG. 14 is a top plan view of the mounting point device as seen along line 14—14 of FIG. 12.

FIG. 15 is a front elevational view of a third embodiment of the mounting point device used with the system of FIG. 1 in muddy conditions.

FIG. 16 is a side elevational view of the mounting point device as seen along line 16—16 of FIG. 15.

FIG. 17 is a top plan view of the mounting point device as seen along line 17—17 of FIG. 15.

FIG. 18 is a top plan view of different extended conditions of a surface mounting bracket used with the system of FIG. 1 on surfaces where penetration is either not possible or permitted.

FIG. 19 is a top plan view of the surface mounting bracket of FIG. 18 in a retracted condition.

FIG. 20 is a side elevational view of the surface mounting bracket as seen along line 20—20 of FIG. 19.

FIG. 21 is a side elevational view of the spacer post of FIG. 17 supported by a surface mounting block used with the system of FIG. 1 on surfaces where penetration is either not possible or permitted.

FIG. 22 is an enlarged side elevational view of the surface mounting block of FIG. 21.

FIG. 23 is a top plan view of the surface mounting block as seen along line 23—23 of FIG. 22.

DETAILED DESCRIPTION OF THE DRAWINGS

Figure 1:
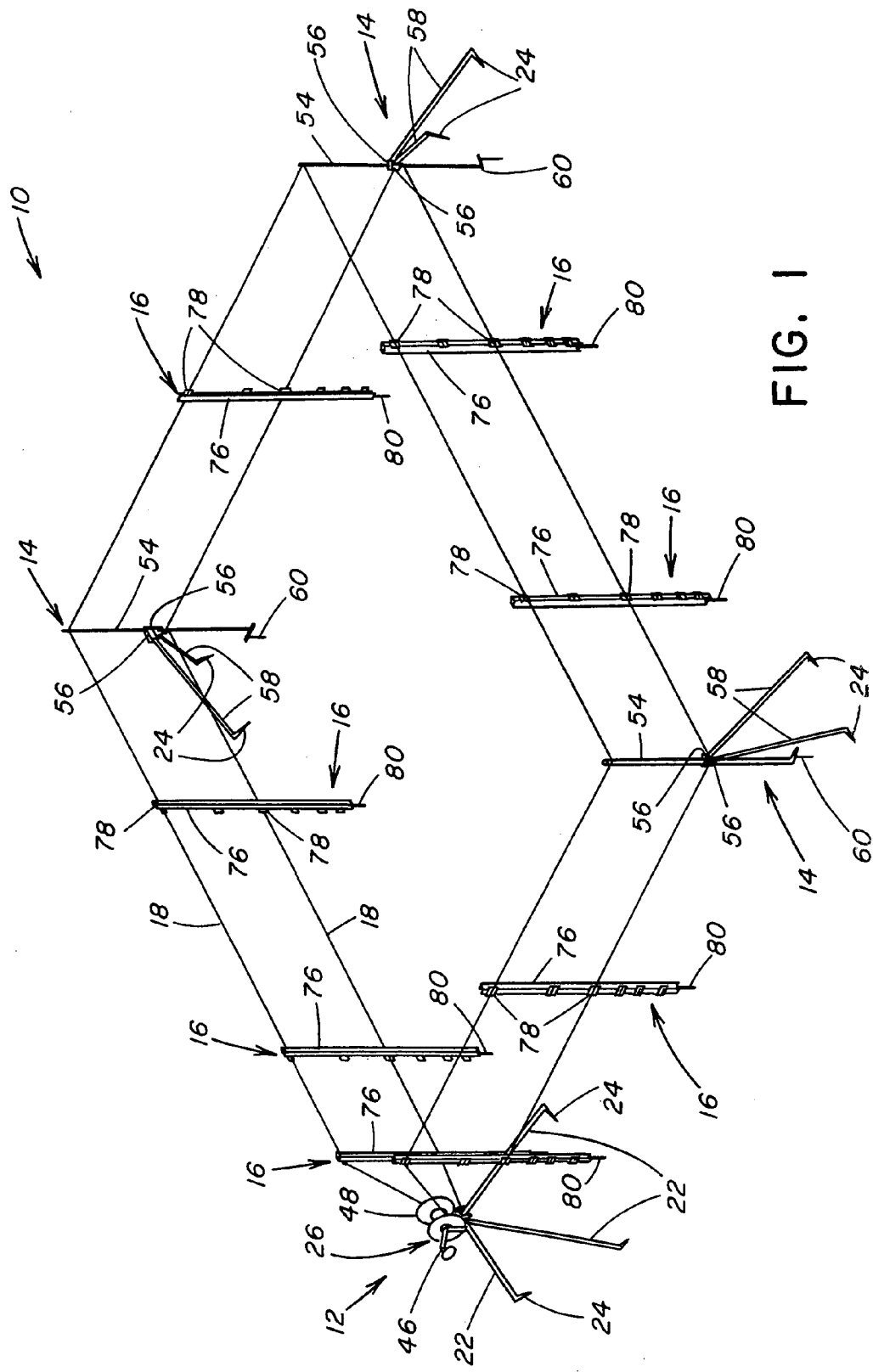
FIG. 1 is a perspective view of an embodiment of an enclosure arrangement of a portable fencing system of the present invention.

Referring to the drawings and particularly to FIG. 1, there is illustrated an embodiment of an enclosure barrier arrangement of the portable fencing system of the present invention, generally designated 10, shown having a typical rectangular configuration. However, it should be understood that the portable fencing system 10 can be employed to provide almost any size and shape of an enclosure barrier around an area or a corridor or line barricade along a side of an area. The typical enclosure barrier arrangement of the system 10, such as that shown in FIG. 1, includes at least one winch corner fixture 12, a plurality of corner post fixtures 14, a plurality of spacer posts 16, and at least one fence wire 18. The typical line barricade or corridor arrangement of the portable fencing system 10 of the present invention, that would be similar to one side of the rectangular enclosure barrier arrangement of FIG. 1, includes a winch corner fixture 12, usually a corner post fixture 14 but not necessarily if a suitable end connection structure is otherwise available, a plurality of spacer posts 16, and at least one fence wire 18. In forming both the enclosure and barricade or corridor arrangements, each of the winch corner fixture 12, corner post fixtures 14 and spacer posts 16 are removably anchorable to the ground generally without the use of tools. The term "ground" or "ground segment" is used herein in a generic sense to include any type of surface or substrate.

Figure 3:
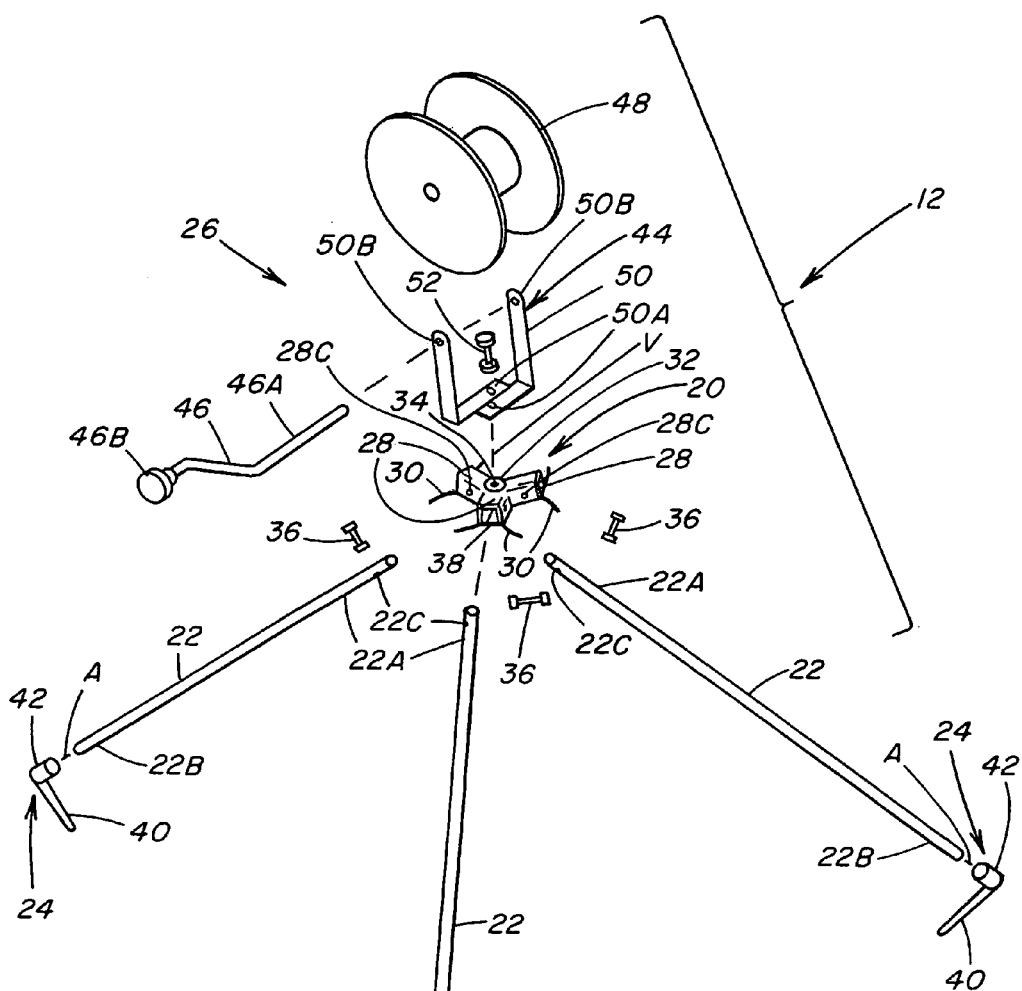
FIG. 3 is an exploded perspective view of the winch corner fixture of FIG. 2.

Referring to FIGS. 1 to 3, the winch corner fixture 12 basically includes a main support frame 20, a plurality of at least three spaced apart leg members 22, a plurality of at least three ground anchor stakes 24, and at least one winch assembly 26. As best seen in FIGS. 2 and 2A, the main support frame 20 of the winch corner fixture 12 includes at least three mounting portions 28 and means attached thereon about which to wrap the ends of the fence wires 18 such as in the form of three fence wire anchor clasps or brackets 30. The mounting portions 28 preferably, although not necessarily, are in the form of structural channels having inverted U-shaped configurations which preferably, although not necessarily, are about equally angularly displaced from one another about a central vertical axis V of the support frame 20. The fence wire anchor brackets 30 are mounted at respective outer end 28A of the mounting portions 28. The main support frame 20 further includes an attachment member 32 such as in the form of an annular washer that overlies and bridges and is rigidly attached to inner ends 28B of the mounting portions 28 so as to help fixedly tie the three mounting portions 28 together. The attachment member 32 also may define a central mounting hole 34 therethrough at the central vertical axis V of the support frame 20. The fence wire anchor brackets 30 are used for tying off the ends or portions of the fence wires 18.

Each of the leg members 22 of the winch corner fixture 12 has an upper end 22A and a lower end 22B. The leg members 22 at their upper ends 22A are inserted through open bottoms of the mounting portions 28 of the main support frame 20 behind the fence wire anchor brackets 30 and are hingedly or pivotally mounted to the mounting portions 28 by suitable fasteners 36 inserted through alignable holes 22C, 28C defined in the leg members 22 and the mounting portions 28. The pivotal leg members 22 can thus be pivoted toward one another so as to be held next to each other for convenient carrying and storage or pivoted away from one another until they abut against stops 38 defined by central portions of the fence wire anchor brackets 30 for setting the leg members 22 in a tripod configuration. In such a configuration, the leg members 22 are displaced from one another about the central vertical axis V of the support frame 20 at the same angles as the mounting portions 28 of the support frame 20 are displaced from one another. When the leg members 22 are set up, the particular angles they will make with the ground and central vertical axis V of the support frame 20 depends upon the locations of the holes 28A in the mounting portions 28 of the support frame 20 relative to the stops 38 of the anchor brackets 30. Given the particular location shown in FIG. 2A, the leg members 22 when set up will extend outwardly and downwardly at about a 45° angle from the central vertical axis V of the support frame 20 and relative to the ground.

As best seen in FIGS. 2 and 2B, each of the ground anchor stakes 24 of the winch corner fixture 12 has a relatively straight stake portion 40 and a tubular sleeve portion 42 attached at one end of the stake portion 40 for mounting over the lower end 22B of one of the leg members 22 of the winch corner fixture 12. The stake portion 40 preferably, although not necessarily, is disposed at about a 90° angle in relation to a longitudinal axis A of the tubular sleeve portion 42 and thus of the leg member 22. Each stake portion 40 is insertable into the ground for securing the respective leg member 22 in place on the ground. When the winch corner fixture 12 is to be installed, the leg members 22 are spread outward against their respective stops 38 (which extends them outward at about 45° angles from the central vertical axis V) and the fixture 12 is set on top of the ground. The inward 90° orientation of the stake portions 40 of the ground anchor stakes 24 relative to the leg members 22 makes it easy for the installer to step on the lower ends 22B of the leg members 22 above the downwardly extending stake portions 40 and then use his or her body weight to force the stake portions 40 into the ground. The greatest strength is achieved when one of the leg members 22 is oriented to the inside of the fence enclosure arrangement at an angle halfway between the angle at which the fence wires 18 will meet at that corner. This way when the fence wire 18 is tightened it will cause the inside leg member 22 to go into compression, which means it is being forced into the ground so it is not in danger of coming out because the ground is very strong in compression. The two leg members 22 located outside the enclosure arrangement will then be in tension at the lowest possible level of force, because tension forces are the hardest to anchor in the soil. However, when achieving maximum strength is not necessary, it is best to place all three leg members 22 of the fixture 12 outside of the enclosure arrangement with two of the leg members 22 disposed adjacent to and outside of the fence wires 18 meeting at the corner of the enclosure arrangement. This placement of the leg member 22 eliminates the chance of an animal striking, pawing, stepping on or otherwise encountering the leg members 22. The approximate 90° orientation of the anchor portions 40 of the ground anchor stakes 24 with the respective leg members 22 is what gives maximum holding power in the soil because it causes the anchor portions 40 to try to "plow" (shear) their way through the soil instead of simply being pulled out. Soil can hold the stake much better in shear than it is able to hold a stake in tension. This is especially true in pastures where the root system of the grass significantly strengthens the soil's resistance to shearing forces.

The winch assembly 26 of the winch corner fixture 12 includes a support bracket 44, a crank handle 46, and a winch reel or spool 48. The support bracket 44 is formed in a generally U-shaped configuration by a pair of L-shaped bracket portions 50 which are placed together and stationarily mounted to the support frame 20 by a fastener 52 inserted through the mounting hole 34 of the attachment member 32 of the support frame 20 and bottom holes 50A of the bracket portions 50 which are alignable with one another and with the mounting hole 34 of the attachment member 32. The winch spool 48 is supported between the bracket portions 50 of the U-shaped support bracket 44 on a shaft portion 46A of the crank handle 46 which extends through top holes 50B of the bracket portions 50. The winch spool 48 is thus mounted for undergoing rotation relative to the support bracket 44 using a handle portion 46B of the crank handle 46 to turn the crank handle 46 and the winch spool 48. The winch spool 48 is thus stationarily mounted over the shaft portion 46A of the crank handle 46 and is rotatable therewith for taking up and paying out the fence wire 18 on and from the spool 48. While the winch spool 48 is shown mounted by the support bracket 44 for rotation about a horizontal axis, it should be understood that the support bracket 44 could be modified to support the winch spool 48 for rotation about a vertical axis. Also, the support bracket 44 could be modified to support a pair of the winch spools 48 each on one of a pair of crank handles 46 mounted one above the other on the modified support bracket.

Most arrangements of the system 10 will require at least one winch corner fixture 12 because it provides a limited length of the fence wire 18 based upon the capacity of the winch spool 48 with the type of fence wire 18 being used. If the proposed enclosure barrier or barricade arrangement will be longer than the length of fence wire 18 that can be stored on the winch spool 48, a sufficient number of additional winch corner fixtures 12 will need to be included in the arrangement to supply the system 10 with the desired length of fence wire 18. These additional winch corner fixtures 12 can be placed on the corners or in line, wherever is deemed most appropriate for the particular arrangement. The fence wire anchor brackets 30 on the respective winch corner fixtures 12 can be used to tie off the end of the fence wire 18 from the previous winch spool 48 and continue on with the fence wire 18 from the next winch spool 48.

Figure 5:
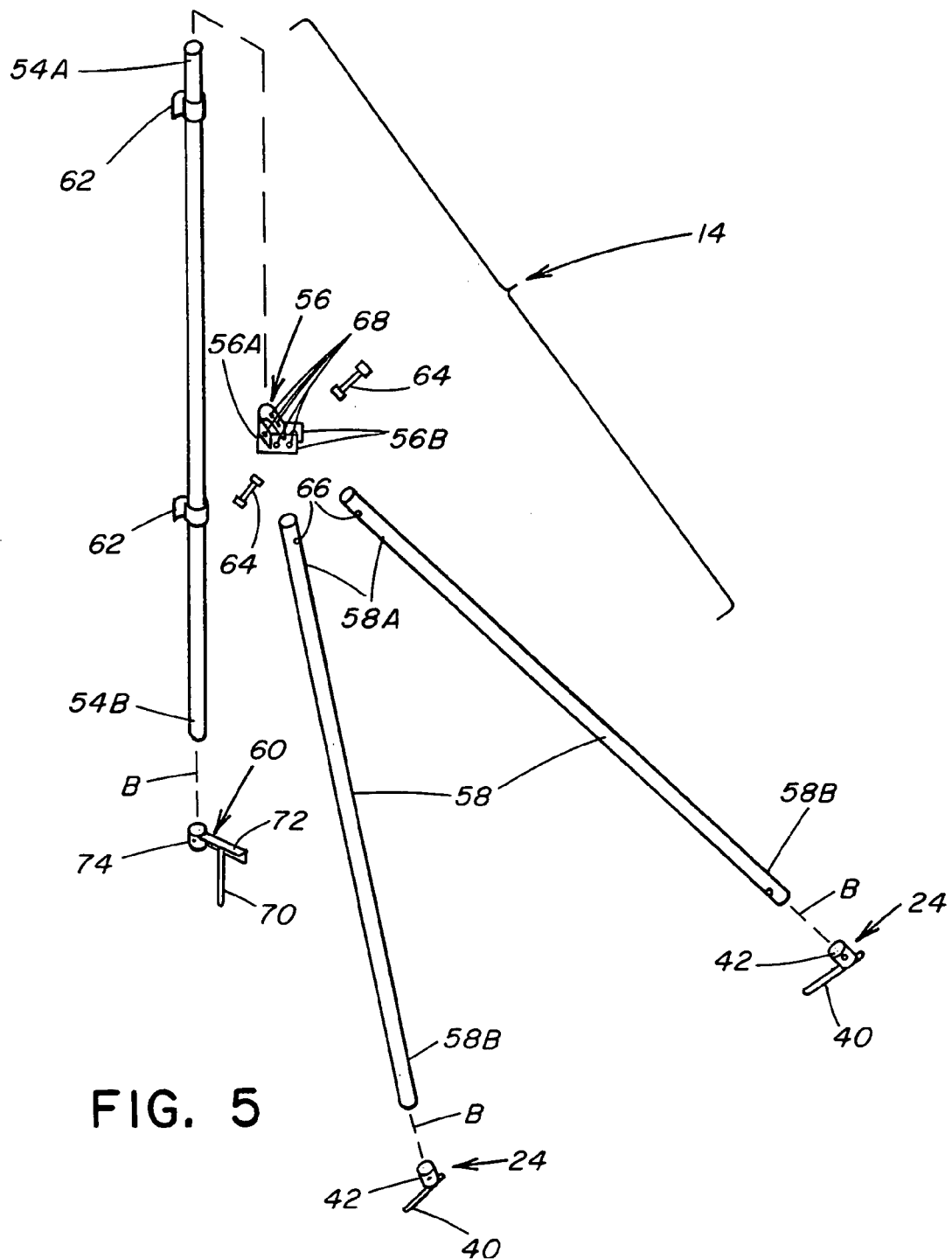
FIG. 5 is an exploded perspective view of the corner post fixture of FIG. 4.

Referring to FIGS. 1 and 4, 5, the corner post fixture 14 basically includes a post member 54, a pair of separate support bracket 56, a pair of brace members 58, a pair of the ground anchor stakes 24 (the same as used on the leg members 22 of the winch corner fixture 12), a step bracket anchor stake 60, and at least one and preferably a pair of wire securing devices 62 in the form of adjustable clips. The post member 54 of the corner post fixture 14 has an upper end 54A and a lower end 54B. The support brackets 56 of the corner post fixture 14 are secured to the post member 54 at stationary locations intermediate between the upper and lower ends 54A, 54B thereof. The support brackets 56 each have a substantially U-shaped configuration. Each of the brace members 58 of the corner post fixture 14 is pivotally mounted by a fastener 64 through alignable holes 66, 68 in an upper end 58A of the respective brace member 58 and in a respective one of the support brackets 56 such that the brace members 58 can be extended outwardly and downwardly at a suitable angle, such as a 45° angle, in relation to the post member 54 and displaced at a suitable angle, such as 60°, from one another. The support brackets 56 are independently rotatable on the post member 54 so that they can be separately relocated horizontally about and vertically on the post member 54 to ensure that both brace members 58 independently of one another can be inserted in the ground and will hold the post member 58 in an upright orientation.

Each of the ground anchor stakes 24 of the corner post fixture 14 has the relatively straight stake portion 40 and the tubular sleeve portion 42 attached at one end of the stake portion 40 for mounting over the lower end 58B of the respective one of the brace members 58. The stake portion 40 is disposed at about a 90° angle in relation to the longitudinal axis B of the tubular sleeve 42 and thus of the brace member 58. The stake portion 40 is insertable into the ground for securing the brace member 58 in place on the ground. The step bracket anchor stake 60 has a straight stake portion 70 and an angled step portion 72 both attached together in a substantially L- or T-shaped configuration, and a tubular sleeve portion 74 attached at one end of the step portion 72 for mounting to the lower end 54B of the post member 54. The angled step portion 72 of the anchor stake 60 is adapted to receive the installer's foot thereon for forcing the stake portion 70 thereof into the ground. Each of the adjustable clips 62 is mounted to the post member 54 for holding the fence wire 18 on the corner post fixture 14.

On a straight-line barricade arrangement, if some appropriate stationary structure is not available a corner post fixture 14 can be used to serve as the anchor for the end of the fence wire 18, whereas on enclosure arrangements, a corner post fixture 14 is placed at every "corner" point where the fence wire 18 will change directions. The corner post fixture 14 and its anchorage components are designed to withstand the lateral forces caused by the tensioned fence wire 18 when it changes direction at that corner. To install the corner post fixture 14, the post member 54 is positioned where required by the type of enclosure barrier arrangement or barricade arrangement being erected. Using the step bracket anchor stake 60, the installer forces the stake portion 70 into the ground. The two brace members 58 are then positioned outside of the boundary of the arrangement at an orientation approximately halfway between the angle that would be made by the fence wires 18 if they were extended past the corner. The support brackets 56 should be stationarily positioned along the length of the post member 54 so that the brace members 58 once installed to the ground will hold the post member 54 in the upright orientation. This assures that the brace members 58 will be placed in tension when the fence wire 18 is tightened and the post member 54 will be forced down against the ground so it will not be in danger of coming out. As was the case with the winch corner fixture 12 discussed earlier, the post member 54 in compression and the two brace members 58 in tension with the 90° angle orientation of the stake portions 70 to the brace members 54 is what provides maximum holding power in the soil because it causes them to try to "plow" (shear) the stakes through the soil instead of simply being pulled out.

Referring to FIGS. 1, 6 to 8, the spacer post 16 includes a post backbone 76 having an upper end 76A and a lower end 76B, a plurality of spaced apart wire guiding devices 78, a ground anchor stake 80, and a step bracket 82. Each guiding device 78 is either an integral part of the post backbone 76 as seen in FIG. 6 or is a separate part that is adjustably mounted to the post backbone 76 as seen in FIGS. 7 and 8. The guiding device 78 can have a slot 84 defined therein for receiving the fence wire 18 therethrough. In the post 16 of FIG. 6, the slot 84 preferably is angled to allow the fence wire 18 to be easily placed into the guiding device 78 when the fence wire 18 has no tension and not to allow the fence wire 18 to come out from the guiding device 78 when the fence wire 18 has tension thereon. In the posts 16 of FIGS. 6–8, the slot 84 of the guiding device 78 is configured for receiving the fence wire 18 so as to allow the fence wire 18 to slide horizontally (longitudinally), but not vertically, relative thereto. The guiding devices 78 can take either of the forms shown in FIG. 6, in FIGS. 7, 7A and 7B or in FIGS. 8 and 8A. In FIG. 6, the guiding device 78 is stationarily attached to the post backbone 76. In FIGS. 7, 7A and 7B, the guiding device 78 is a clip 86 stationarily secured to the post backbone 76 by a double wedge 88. In FIGS. 8 and 8A, the guiding device 78 is another clip 90 stationarily secured to the post backbone 76 by a set screw 92. In either form, the guiding devices 78 hold the fence wires 18 at the desired separation.

The ground anchor stake 80 of each spacer post 16 has a generally straight configuration and is preferably a continuation of the lower end 76B of the post backbone 76 and extends longitudinally inline with the post backbone 76 so as to be insertable into the ground for securing the post backbone 76 in place on the ground. The step bracket 82 is mounted to the post backbone 76 adjacent to the lower end 76B thereof and, as seen in the embodiments of FIGS. 7 and 8, has a spike 94 attached to and extending downward from an outer end 82A of the step bracket 82. The step bracket 82 receives thereon the installer's foot to force the ground anchor stake 80 and outer spike 94 into the ground.

Since the spacer posts 16 are not subject to high lateral forces, they can stand alone without additional bracing being needed. A number of the spacer posts 16 are placed at intervals along the length of the straight sections of the fence wire 18 between the winch corner fixture 12 and/or corner post fixtures 14. The function of the spacer posts 16 is to maintain a desired separation between strands of a multiple-wire enclosure or barricade and to keep the sag in the wire 18 to an acceptable minimum. Preferably, an extra spacer post 16 is provided on either side of the winch corner fixture 12 to immediately establish the desired fence wire height above the ground and multi-strand spacing for the system 10.

Referring again to the enclosure arrangement of FIG. 1, at least one and preferably a pair of strands of the fence wire 18 of the system 10 pass between and are secured to the corner post fixtures 14 and spacer posts 16. The strands of fence wire 18 extend from the winch spool 48 of the winch corner fixture 12 and are tied off on the fence wire anchor brackets 30 of the support frame 20 of the winch corner fixture 12. The fence wire 18 can be any available round wire, cable, rope or flat tape. The term "wire" is used herein in a generic sense to include any of these types. For containment of animals the choice is usually some form of electrifiable wire or rope. The electrification of the wire, in addition to preventing the animals from pushing through and escaping the containment, also keeps the animals from pressing casually against the portable fencing system 10 causing forces that the fencing system 10 is not designed to withstand.

Referring to FIGS. 9 to 17, there are illustrated several different mounting point devices 96 designed to assist the winch corner fixture 12 and corner post fixture 14 of the portable fencing system 10 in overcoming the weaknesses of different ground segments having characters that lack the characteristics normally desired to accommodate the set up of the system 10. Each of the mounting point devices 96 includes a support base member 98 and penetration means 100 extending downwardly from the base member 98 for penetrating the particular ground segment. After the penetration means 100 on the base member 98 is placed into the ground segment by using one's body weight, a mallet or the like, the stakes 24 of a winch corner fixture 12 or a corner post fixture 14 is inserted through a middle hole 102 in the support base member 98 and also placed into the ground segment. In such manner, the mounting point device 96 enhances and extends the anchorage normally provided by the respective fixture 12, 14. FIGS. 9 to 11 show an embodiment of the mounting point device 96 having a base member 98 in the form of an angle bracket and penetration means 100 in the form of a pair of spikes fixed to and extending in parallel relation from the opposite ends of the bracket 98 for use in the installation of the system 10 in weak soil conditions, such as sandy loams, freshly disced fields, soils with little root structure, pebbly mountainside and rock soils, very wet and soft sods, etc. FIGS. 12 to 14 show another embodiment of the mounting point device 96 having a base member 98 in the form of a rigid plate and penetration means 100 in the form of a rigid flat spade-like blade for use in the installation of the system 10 in sand conditions. FIGS. 15 to 17 show still another embodiment of the mounting point device 96 having a base member 98 in the form of a rigid plate and penetration means 100 in the form of a rigid flat hoe-like blade for use in the installation of the system 10 in muddy conditions. Each of the embodiments of the mounting point devices 96 also has a rope handle 104 attached to the base member 98 to facilitate easy extraction of the device 96 from the particular ground segment once its use has ended.

Referring to FIGS. 18 to 20, there is illustrated a surface mounting bracket 106 designed to assist the setup of the winch corner fixture 12 and the corner post fixture 14 of the portable fencing system 10 on surfaces where penetration is either not possible or permitted, such as concrete or paved surfaces or driveways, arenas, floors, hard pan, shelf rock, hard campgrounds, etc. The bracket 106 has a lower member 108 which lies on the surface and an upper member 110 which is pivotally mounted at one end 110A to the lower member 108 near a corresponding one end 108A thereof. A short tube 112 is fixedly mounted in an upright orientation at the one end 108A of the lower member 108 of the surface mounting bracket 106. The stake 70 of the fixture 14 clips into the short tube 112 of the surface mounting bracket 106. The lower and upper members 108, 110 of the bracket 106 have turned up other ends 108B, 110B with respective centered holes therethrough for receiving the stakes 24. FIG. 18 shows different extended conditions of the upper member 110 relative to the lower member 108 of the surface mounting bracket 106. It is required that sand bags or other weighted objects (not shown) be applied on the surface mounting bracket 106 to stabilize the respective fixture 12, 14. FIG. 19 shows the lower and upper members 108, 110 of the surface mounting bracket 106 in a retracted condition.

Referring to FIGS. 21 to 23, there is illustrated a surface mounting block 114 designed to assist the setup of the spacer posts 16 of the portable fencing system 10 on the surfaces mentioned earlier where penetration is either not possible or permitted. The block 114 preferably, but not necessarily, is rectangular in configuration and has a central hole 116 therethrough for receiving the ground anchor stake 80 of the spacer post 16 so as to hold the post 16 in an upright orientation as shown in FIG. 21. One material useful for constructing the block 114 so that it will have a weight suitable for performing the desired function described above is recycled plastic lumber.

The portable fencing system 10 of the present invention as now fully described hereinabove is designed for use on all traversable surfaces of ground ranging from pure sand to solid rock. It should be understood that by merely drilling three small shallow holes in hard surfaces, such as rock, the spike points of the stakes 25 of the winch corner fixture 12 can be inserted into the holes and the fixture 12 thereby held and anchored on the hard surface without the use of any accessory, such as the above-described surface mounting bracket 106.

The installation of the portable fencing system 10 to provide the enclosure barrier arrangement of FIG. 1 can be accomplished by the performance of the following steps:

(1) The "tripod" or winch corner fixture 12 is placed in a desired location, setting its leg members 22 at the desired angle. With his or her heel on the ground, the installer pushes each ground anchor stake 24 into the soil with the ball of his or her foot. If multiple corner post fixtures 14 are to be used, roughly place them and "step" them in at this time, also.

(2) Holding the fence wire 18 by a nonconductive handle (not shown) that can be provided at the end of the fence wire 18, the installer walks across or around the area to be fenced or enclosed, pulling the fence wire 18 behind. Sufficient slack must be left in the wire or sufficient wire must be left on the winch spool 48 to later tighten and wrap the fence wire 18.

(3) The installer then hooks the nonconductive handle onto the end point of the portable fence system 10. If one is forming an enclosure, this end point will be the tripod or winch corner fixture 12 itself, using one of the wire wrap anchor brackets 30 at the base of the spool 48. The handle permits the use of the portion of the wire extending from the spacer post 16 next to the winch corner fixture 12 as an entryway to the enclosure.

(4) The installer next steps in the line or spacer posts 16 at the desired locations along the fence line.

(5) The pair of fence wires 18 are then inserted through the securing and guiding devices 62, 78 on all corner post fixtures 14 and spacer posts 16. One should start at the tripod or winch corner fixture 12 and work towards the end point of the portable fencing system 10 so as to prevent accidental twisting of the two strands of fence wire 18.

(6) At the tripod or winch corner fixture 12, the pair of fence wire strands 18 are pulled to the tension desired. Some slack in the fence line is recommended. At this point, lots of slack hanging off the spool 48 is okay and in fact helpful.

(7) Holding on to both wire strands 18, the installer now lays one wire 18 across one of the wire wrap anchor brackets 30 on the tripod or fixture 12. Using the excess slack that is hanging off the spool 48 (and not the taught fence wire), the installer now wraps about three times around the wire wrap anchor bracket 30.

(8) The installer concludes the steps by applying electricity to the fence wire 18 from a suitable electrical power supply source.

In conclusion, the main features and advantages of the portable fencing system 10 of the present invention can be summarized as follows:

(1) The fencing system 10 is highly portable, it requires no tools to install and it has components that are made of lightweight materials, are compact, and easy to transport or store. It is easy to set up, utilizes a shallow penetration of the earth which generally permits installation using the installer's body weight alone, and yet it demonstrates exceptional anchorage strength in the ground.

(2) The corner formed by the multiple leg members 22 with the winch spool 48 centered on top of the fixture 12 is advantageous in that the orientation of the winch spool 48 to the angled leg members 22 assures that the anchorage forces will be equally divided between the leg members 22 for maximum resistance to separation from the ground. Three leg members 22 are the minimum required; other embodiments could use more legs to gain additional ground anchorage strength.

(3) The main support frame 20 of the fixture 12 maintains the proper orientation and pivoting of the three leg members 22 as well as provides anchorage brackets 30 for the ends of the strands of fence wire 18.

(4) The orientation of the stakes 24 on the leg members 22 is advantageous in how each stake 24 is caused to act like a "plow" under load which takes advantage of the superior shear strength found in pasture soils with good grass root systems. Whereas the anchor portion 40 of the anchor stake 24 shown in the illustrated embodiment is of a simple round configuration and of a relatively short length, it should be understood that other shapes and longer lengths can be used for the many different soil conditions to which it may be exposed.

(5) The configuration of the corner post fixtures 14 with their arrangement of corner brace members 58 outside of the enclosure arrangement of the fence system 10 whereby fence tension forces place these brace members 58 in tension to fully utilize the advantages of the anchorage feature noted in (4) above. If the brace members 58 were, instead, merely oriented in the direction of the fence wire 18 and placed into the interior of the enclosure arrangement, they would be put in compression and would cause the vertical corner post member 54, unless securely anchored, to be leveraged upward and out of the ground.

The portable fencing system 10 of the present invention, as described in detail above, can be used for a multitude of functions including, but not limited to, the following: (1) providing enclosures or barriers for the containment of livestock, people or vehicles; (2) defining barricades or corridors for the preventing or directing of movement of livestock, people and vehicles; (3) defining boundaries for sports fields, arenas or crime scenes; (4) providing dividers for sports fields or arenas; (4) providing portable paddocks; (5) capture assist for animals; and (6) for testing out various fencing strategies before building permanent fence.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A portable fencing system useful for forming a barricade, said system comprising:
    a corner post fixture having a central post member removably anchorable on a first ground segment for providing an end of the barricade;
    wherein said corner post fixture further comprises a step bracket anchor stake attached to an end of said central post member, said step bracket anchor stake having an angled step portion and a first stake portion insertable into the first ground segment by stepping on said angled step portion;
    at least one length of fence wire, said corner post fixture having means for securing said fence wire thereto;
    said corner post fixture further comprising one or more rigid positionable brace members, each of said one or more brace members pivotally connectable to said central post member via a support bracket;
    each of said support brackets being separable from another and independently adjustably mounted on said central post member between opposite ends thereof;
    each of said one or more brace members having an anchor for securing said corner post fixture at a shallow ground penetration depth;

each of said brace member anchors having a stake portion extending inwardly toward a central vertical axis in a transverse relation from a respective brace member such that said stake portion is insertable into the first ground segment by stepping on each of said brace member anchors on an opposite side thereof from said stake portion;

each of said one or more brace members located outbound from the fence wire, thereby causing the central post member to go into compression and each of said one or more brace member anchors to be pulled against the first ground segment when said length of fence wire is tightened;

a winch corner fixture removably anchorable on a second round segment for providing an end of the barricade, said winch corner fixture further comprising a plurality of at least three spaced apart leg members each pivotally mounted to one of three mounting portions of a non-telescoping support frame such that said leg members can be set up in a tripod configuration about a central vertical axis of said support frame with said leg members angularly displaced from one another about said central vertical axis of said support frame at the same angular displacements of said mounting portions of said support frame from one another; and a winch assembly mounted upon the support frame above said mounting portions thereof said winch assembly having the fence wire extended therefrom, said fence wire secured to a first position on said corner post fixture via said securing means.

2. The system of claim 1, wherein said winch corner fixture further comprises a plurality of at least three ground anchor stakes each attached to an end of said leg members, wherein each of said ground anchor stakes has a stake portion extending inwardly toward said central vertical axis of said support frame in a transverse relation from said one of said leg members such that said stake portion is insertable into the second ground segment by stepping on said ground anchor stake on an opposite side thereof from said stake portion.

3. The system of claim 2, wherein said stake portion extends at about a 90° angle to a respective leg member or a respective brace member.

4. The system of claim 1, wherein each of said brace members are angularly displaced from one another about said central post member and each can be extended outwardly and downwardly at an acute angle relative to said central post member.

5. The system of claim 1 further comprising at least one spacer post locatable between and spaced from said winch corner fixture and said corner post fixture and removably attached on a third ground segment, said spacer post having means for engaging said fence wire.

6. The system of claim 5, wherein said spacer post further comprises:
a post backbone, said wire engaging means being at least one wire guiding device mounted on said post backbone;
a ground anchor stake mounted to an end of said post backbone so as to be insertable into the third ground segment for holding said post backbone in place on the third ground segment; and
wherein said ground anchor stake further comprises a step bracket having a spike attached to and extending downward from said step bracket such that said spike is insertable in the third ground segment by stepping on said step bracket.

7. The system of claim 1 further comprising mounting device means functioning to support and thereby assist setting up of said winch corner fixture and said corner post fixture on a ground segment of a character lacking in strength normally required to accommodate the setting up of said fixtures or where penetration is not possible or permitted, said fixtures each having at least one anchor stake located at ground ends thereof.

8. The system of claim 7, wherein said mounting device means further comprises a handle to facilitate extraction of said mounting device means from the ground segment.

9. The system of claim 1 further comprising a plurality of corner post fixtures each having a central post member removably anchorable on a ground segment, each of said corner post fixtures providing a corner of an enclosure arrangement and each further comprising a rigid positionable brace member having an anchor for securing each corner post fixture at a shallow ground penetration depth, wherein each rigid positionable brace member is located outbound from the fence wire, wherein each central post member goes into compression and each brace member anchor is pulled against the ground segment when said length of fence wire is tightened.

10. A corner post fixture useful in a portable fencing system, said fixture comprising:
a central post member;
a pair of rigid positionable brace members, each depending at an acute angle from the central post member;
a pair of support brackets each separate from the other and independently adjustably mounted on said central post member between opposite ends thereof, each of said brace members being pivotally mounted to one of said support brackets such that said brace members are angularly displaced from one another about said central post member and each can be extended outwardly and downwardly at an acute angle relative to said central post member;
a step bracket anchor stake attached to an end of said central post member, said step bracket anchor stake having an angled step portion and a stake portion insertable into the ground by stepping on said angled step portion;
a pair of ground anchor stakes each attached to an end of one of said brace members, wherein each of said ground anchor stakes has a stake portion extending inwardly toward a central vertical axis in a transverse relation from said one of said brace members, such that said stake portion is insertable into the ground by stepping on said ground anchor stake on an opposite side thereof from said stake portion; and
wherein the brace members are placed in tension to support the central post member when a force is applied away from the brace members.

11. The fixture of claim 10, wherein said central post member has means for securing portions of a fence wire thereto.

12. The fixture of claim 10 further comprising a mounting device means adapted to support one of said ground anchor stakes, said means functioning to assist setup of said corner post fixture on a ground segment of a character lacking in the strength normally required to accommodate the setting up of said fixture or where penetration is not possible or permitted.

13. The fixture of claim 12, wherein said mounting device means further comprises a handle to facilitate extraction of said mounting device means from the ground segment.

14. A portable fencing system useful for forming a barricade, said system comprising:
- a winch corner fixture removably anchorable on a first ground segment for providing one end of the barricade;
- a corner post fixture removably anchorable on a second ground segment for providing an opposite end of the barricade;
- at least one length of fence wire storable on said winch corner fixture and extendable therefrom so as to extend between said fixtures, said winch corner fixture and corner post fixture each having means for securing said fence wire thereto;
- wherein said winch corner fixture includes a non-telescoping main support frame having at least three mounting portions angularly displaced from one another about a central vertical axis of said main support frame;
- wherein said winch corner fixture further includes a plurality of at least three spaced apart leg members each pivotally mounted to one of said mounting portions such that said leg members can be set up in a tripod configuration about said central vertical axis of said support frame with said leg members angularly displaced from one another about said central vertical axis at the same angular displacements of said mounting portions of said support frame from one another; and
- a winch assembly mounted upon the support frame above said mounting portions thereof.

15. A portable fencing system useful for forming a barricade, said system comprising:
- a winch corner fixture removably anchorable on a first ground segment for providing one end of the barricade;
- a corner post fixture removably anchorable on a second ground segment for providing an opposite end of the barricade;
- at least one length of fence wire storable on said winch corner fixture and extendable therefrom so as to extend between said fixtures, said winch corner fixture and corner post fixture each having means for securing said fence wire thereto;
- wherein said corner post fixture further comprises a central post member, a pair of rigid positionable brace members, and a pair of support brackets each separate from the other and independently adjustably mounted on said central post member between opposite ends thereof, each of said brace members being pivotally mounted to one of said support brackets such that said brace members are angularly displaced from one another about said central post member and each can be extended outwardly and downwardly at an acute angle relative to said central post member;
- wherein each brace member further comprises a ground anchor stake having a stake portion extending indwardly toward a central vertical axis in a transverse relation from said one of said brace members such that said stake portion is insertable into the second ground segment by stepping on said ground anchor stake on an opposite side thereof from said stake portion;
- wherein said corner post fixture further comprises a step bracket anchor stake attached to an end of said central post member, said step bracket anchor stake having an angled step portion and a stake portion insertable into the second ground segment by stepping on said angled step portion;
- wherein said winch corner fixture includes a non-telescoping main support frame having at least three mounting portions angularly displaced from one another about a central vertical axis of said main support frame;
- wherein said winch corner fixture further includes a plurality of at least three spaced apart leg members each pivotally mounted to one of said mounting portions such that said leg members can be set up in a tripod configuration about said central vertical axis of said main support frame with said leg members angularly displaced from one another about said central vertical axis of said main support frame at the same angular displacements of said mounting portions of said main support frame from one another; and
- a winch assembly mounted upon the main support frame above said mounting portions thereof.

16. A portable fencing system useful for forming an enclosure arrangement, said system comprising:
- a winch corner fixture removably anchorable on a ground segment for providing one corner of the enclosure arrangement;
- a plurality of corner post fixtures removably anchorable on other ground segments for providing other corners of the enclosure arrangement;
- at least one length of fence wire storable on said winch corner fixture and extendable therefrom so as to extend between said fixtures, said winch corner fixture and corner post fixture each having means for securing said fence wire thereto;
- wherein said winch corner fixture includes a non-telescoping main support frame having at least three mounting portions angularly displaced from one another about a central vertical axis of said main support frame;
- wherein said winch corner fixture further includes a plurality of brackets each attached on one of said mounting portions of said main support frame and adapted to have a portion of said fence wire secured about a selected one of said brackets;
- wherein said winch corner fixture further includes a plurality of at least three spaced apart leg members each pivotally mounted to one of said mounting portions such that said leg members can be set up in a tripod configuration about said central vertical axis of said main support frame with said leg members angularly displaced from one another about said central vertical axis at the same angular displacements of said mounting portions of said main support frame from one another; and
- a winch assembly mounted upon the main support frame above said mounting portions thereof.

17. A portable fencing system useful for forming an enclosure arrangement, said system comprising:
- a winch corner fixture removably anchorable on a ground segment for providing one corner of the enclosure arrangement;
- a plurality of corner post fixtures removably anchorable on other ground segments for providing other corners of the enclosure arrangement;
- at least one length of fence wire storable on said winch corner fixture and extendable therefrom so as to extend between said fixtures, said winch corner fixture and corner post fixture each having means for securing said fence wire thereto;
- wherein said corner post fixture includes a central post member, a pair of rigid positionable brace members, and a pair of support brackets each separate from the other and independently adjustably mounted on said central post member between opposite ends thereof, each of said brace members being pivotally mounted to one of said support brackets such that said brace members are angularly displaced from one another about said central post member and each can be extended outwardly and downwardly at an acute angle relative to said central post member;

wherein each brace member further comprises a ground anchor stake having a stake portion extending inwardly toward a central verticle axis in a tranverse relation from a respective brace member such that said stake portion is insertable into a respective ground segment by stepping on said ground anchor stake on an opposite side thereof from said stake portion;

wherein said corner post fixture further comprises a step bracket anchor stake attached to an end of said central post member, said step bracket anchor stake having an angled step portion and a stake portion insertable into the other ground segment by stepping on said angled step portion;

wherein said winch corner fixture includes a non-telescoping main support frame having at least three mounting portions angularly displaced from one another about a central vertical axis of said main support frame;

wherein said winch corner fixture further includes a plurality of at least three spaced apart leg members each pivotally mounted to one of said mounting portions such that said leg members can be set up in a tripod configuration about said central vertical axis of said main support frame with said leg members angularly displaced from one another about said central vertical axis of said main support frame at the same angular displacements of said mounting portions of said main support frame from one another; and a winch assembly mounted upon the main support frame above said mounting portions thereof.

18. A portable fencing system useful for forming a barricade, said system comprising:

a corner post fixture means functioning to provide an end of the barricade;

said corner post fixture means further comprising a pair of ground anchor stakes each attached to an end of one of a pair of brace members, each of said ground anchor stakes having a stake portion extending inwardly toward a central vertical axis in a transverse relation from said one of said brace members such that said stake portion is insertable into a ground segment by stepping on said ground anchor stake on an opposite side thereof from said stake portion;

said corner post fixture means further comprising a step bracket anchor stake attached to an end of a central post member, said step bracket anchor stake having an angled step portion and a stake portion insertable into the ground segment by stepping on said angled step portion;

at least one length of fence wire means functioning to provide tension on said corner post fixture means when secured thereto and tightened;

a mounting device means functioning to assist setup of said corner post fixture means on a ground segment of character lacking in the strength normally required to accommodate the setting up of said fixture or where penetration is not possible or permitted.

19. A portable fencing system useful for forming a barricade, said system comprising:

a corner post fixture comprising a central post member means, said central post member means functioning to provide an end of the barricade, said central post member means having an anchor stake means attached to a ground end thereof;

a pair of brace member means functioning to support said central post member means, each pair of brace member means depending at an acute angle from the central post member means;

a pair of support bracket means each separate from the other and independently adjustably mounted on said central post member means between opposite ends thereof, each of said brace member means being pivotally mounted to one of said support bracket means, each of said support bracket means functioning to angularly displace said brace member means from one another about said central post member means such that each can be extended outwardly and downwardly at an acute angle relative to said central post member means;

said anchor stake means functioning to secure said central post member means at a shallow ground penetration depth; and a winch corner fixture means functioning to store fence wire.

* * * * *